No. 875,438.  
PATENTED DEC. 31, 1907.

G. W. KETTERINGHAM.  
BOLT AND NUT LOCK.  
APPLICATION FILED MAR. 29, 1907.

George W. Ketteringham, Inventor.

Witnesses.  
By  
Attorney

UNITED STATES PATENT OFFICE.

GEORGE W. KETTERINGHAM, OF NATCHEZ, MISSISSIPPI.

BOLT AND NUT LOCK.

No. 875,438.   Specification of Letters Patent.   Patented Dec. 31, 1907.

Application filed March 29, 1907. Serial No. 365,311.

*To all whom it may concern:*

Be it known that I, GEORGE W. KETTERINGHAM, a citizen of the United States, residing at Natchez, Adams county, and State of Mississippi, have invented a new and useful Bolt and Nut Lock, of which the following is a specification.

The invention relates to improvements in bolt and nut locks.

The object of the present invention is to improve the construction of bolt and nut locks, and to provide a simple, inexpensive and efficient device of great strength and durability, designed for use on railroads, automobiles and various other machinery, and capable of securely locking a bolt to a nut.

A further object of the invention is to provide a nut lock of this character, adapted to be readily applied to a bolt and a nut by unskilled labor, and capable of being readily unlocked and of permitting a nut to be removed from a bolt without injury either to the nut lock or to the bolt and nut.

The invention also has for an object to provide a nut lock adapted to form a guide for enabling the nut to be readily engaged with the threads of the bolt.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
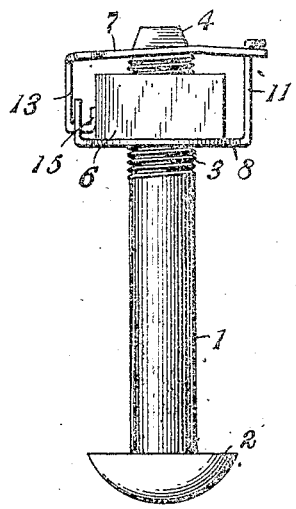
Figure 3:
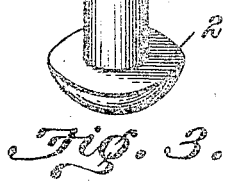
Figure 2:
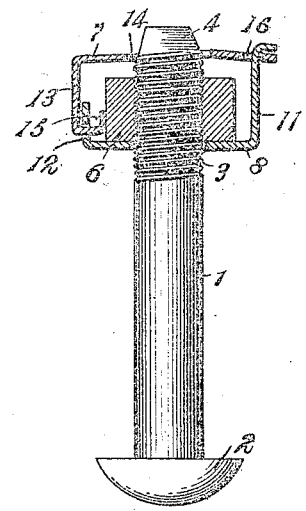
Figure 4:
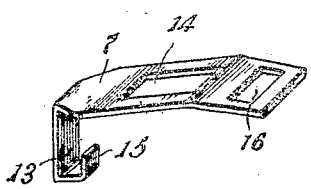
Figure 5:
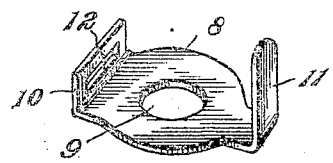

In the drawing:—Figure 1 is a plan view of a bolt and nut lock, constructed in accordance with this invention. Fig. 2 is a longitudinal sectional view of the same. Fig. 3 is a perspective view of the bolt. Fig. 4 is a detail perspective view of the outer plate or catch. Fig. 5 is a similar view of the inner or base plate.

Like numerals of reference designate corresponding parts in all the figures of the drawing.

1 designates a bolt, having a head 2 and provided with screw threads 3, terminating short of the adjacent end 4 of the bolt. The end 4 of the bolt is polygonal and tapered and is formed by a die, or other suitable means, when the head is formed on the bolt. The taper extends from the outer face 5 to the screw threads, and is arranged to guide a nut 6 on the threaded portion of the bolt, whereby the nut may be quickly applied to the bolt without injuring the threads especially when the parts are rusty. The tapered polygonal portion, which is preferably square in cross section, may be of other polygonal shape, and is designed to be provided with at least two opposite plane faces for engagement by an outer catch or plate 7. The outer catch or plate is detachably interlocked with and secured to an inner or base plate 8, which fits flat against the inner face of the nut, and these inner and outer plates may be stamped out of sheet metal, or cast or otherwise formed of any suitable material.

The inner or base plate 8 is provided with a circular bolt opening 9, and it has an outwardly extending flange 10 at one side of the bolt and is provided at the opposite side with an outwardly projecting tongue 11, the flange 10 and the tongue 11 being disposed at right angles to the plane of the body portion of the inner or base plate. The flange 10 is provided with a longitudinal slot 12, and is adapted to be engaged by a hook-shaped arm 13 of the outer plate or catch, which has a centrally arranged oblong opening 14 to receive the tapered polygonal portion of the bolt. The arm 13 has a substantially L-shaped bill or engaging portion 15, which is hooked into the slot 12, and the body or outer portion is then passed over the polygonal portion of the bolt. The hook-shaped arm 15 is drawn firmly into engagement with the nut, and the outer plate or member is retained in engagement with the nut and the polygonal portion of the bolt by the tongue 11, which passes through an end slot 16 of the outer plate or catch. After the tongue 11, which has a rounded outer edge, is passed around the slot 16, it is bent outward or clenched against the exterior of the outer plate or catch at the slotted end thereof. By this construction, the bolt and the nut are securely locked together, and the nut is effectually prevented from accidentally unscrewing. This locking action is obtained without screwing the nut tightly against an object, and the nut may be readily released by disengaging the flat end of the outer plate or catch from the tongue 11, which may be readily straightened for this purpose. The flange 10 and the tongue 11 are spaced sufficiently from the opposite faces of the nut to enable the latter to be screwed on the bolt, and the nut and the nut lock may be readily applied to the bolt with an ordinary monkey-wrench.

Having thus fully described my invention, what I claim as new and desire to secure by Letters Patent, is:—

1. The combination of a bolt provided with a polygonal portion, a nut, an inner or base plate having a bolt opening and fitted against the inner face of the nut and provided at opposite sides thereof with a tongue and a flange having a slot, and an outer plate or catch provided at an intermediate point with an opening to receive the polygonal portion of the bolt and having a hook-shaped arm at one end engaging the slotted flange of the inner or base plate and the adjacent face of the nut, said outer plate or catch being provided at the other end with a slot through which the tongue passes, said tongue being adapted to be bent against the slotted end of the outer plate or catch to retain the same in engagement with the bolt and the nut.

2. The combination with a bolt provided with a polygonal portion, and a nut, of an inner or base plate having a bolt opening and fitted against the inner face of the nut and provided at one side thereof with an outwardly extending slotted flange, an outer plate or catch provided at an intermediate point with an opening to receive the polygonal portion of the bolt, and having a hook-shaped arm at one end extending through the slotted flange of the inner or base plate and engaging the adjacent face of the nut, said inner or base plate and outer plate or catch being detachably connected at the opposite face of the nut.

In testimony, that I claim the foregoing as my own, I have hereto affixed my signature in the presence of two witnesses.

GEORGE W. KETTERINGHAM.

Witnesses:
W. E. WOODWARD,
GEO. J. WOODSIDE.